(12) United States Patent
McCaskill et al.

(10) Patent No.: US 7,587,864 B2
(45) Date of Patent: Sep. 15, 2009

(54) PHOTOVOLTAIC BUILDING MATERIALS AND RELATED METHODS OF INSTALLATION

(75) Inventors: John R. McCaskill, McKinney, TX (US); Matti Kiik, Richardson, TX (US)

(73) Assignee: Elk Premium Building Products, Inc., Dallas, TX (US)

( * ) Notice: Subject to any disclaimer, the term of this patent is extended or adjusted under 35 U.S.C. 154(b) by 665 days.

(21) Appl. No.: 10/991,915

(22) Filed: Nov. 18, 2004

(65) Prior Publication Data

US 2005/0102947 A1     May 19, 2005

Related U.S. Application Data

(60) Provisional application No. 60/523,417, filed on Nov. 19, 2003.

(51) Int. Cl.
*E04D 13/18* (2006.01)
*E04D 1/00* (2006.01)
*E04H 14/00* (2006.01)
*H01L 25/00* (2006.01)

(52) U.S. Cl. .................. 52/173.3; 52/518; 136/243

(58) Field of Classification Search ............ 52/173.3, 52/518; 136/243–265
See application file for complete search history.

(56) References Cited

U.S. PATENT DOCUMENTS

| | | | |
|---|---|---|---|
| 4,321,416 A * | 3/1982 | Tennant | 136/244 |
| 5,232,518 A * | 8/1993 | Nath et al. | 136/251 |
| 5,542,989 A * | 8/1996 | Ichikawa | 136/251 |
| 5,575,861 A * | 11/1996 | Younan et al. | 136/251 |
| 5,590,495 A * | 1/1997 | Bressler et al. | 52/173.3 |
| 5,830,779 A * | 11/1998 | Bressler et al. | 438/65 |
| 5,986,203 A * | 11/1999 | Hanoka et al. | 136/251 |
| 5,990,414 A * | 11/1999 | Posnansky | 136/244 |
| 6,311,436 B1 * | 11/2001 | Mimura et al. | 52/173.3 |
| 6,323,478 B1 * | 11/2001 | Fujisaki et al. | 250/214 SG |
| 6,418,692 B1 * | 7/2002 | Freshwater et al. | 52/553 |
| 6,530,189 B2 * | 3/2003 | Freshwater et al. | 52/553 |
| 6,553,729 B1 * | 4/2003 | Nath et al. | 52/173.3 |
| 6,576,830 B2 * | 6/2003 | Nagao et al. | 136/244 |
| 6,605,774 B2 * | 8/2003 | Hanehira et al. | 136/256 |
| 6,606,830 B2 * | 8/2003 | Nagao et al. | 52/173.3 |
| 6,617,507 B2 * | 9/2003 | Mapes et al. | 136/251 |
| 6,632,993 B2 * | 10/2003 | Hayashi et al. | 136/256 |
| 6,729,081 B2 * | 5/2004 | Nath et al. | 52/173.3 |

(Continued)

*Primary Examiner*—Richard E Chilcot, Jr.
*Assistant Examiner*—Andrew J Triggs
(74) *Attorney, Agent, or Firm*—Baker & McKenzie LLP (57) ABSTRACT

Disclosed herein are photovoltaic building materials and related methods of manufacturing and installing such materials. In one embodiment, a modular roofing structure comprises a photovoltaic shingle panel having a planar lower surface and an upper surface, and a rigid back member having a length the same as or greater than the length of the shingle panel and attached to the planar lower surface of the shingle panel. The roofing structure also includes at least one electrical contact pad on a lower surface of the back member, and at least one electrical conductor electrically coupled to the shingle panel via the lower surface and passing through the back member and out the lower surface. In such embodiments, the electrical conductor is electrically coupled to the at least one contact pad and extends past a front end of the back member sufficient to electrically contact a contact pad on another back member of a separate modular roofing structure couplable to the first.

18 Claims, 4 Drawing Sheets

U.S. PATENT DOCUMENTS

| | | | |
|---|---|---|---|
| 6,928,775 B2 * | 8/2005 | Banister | 52/173.3 |
| 7,138,578 B2 * | 11/2006 | Komamine | 136/251 |
| 2001/0034982 A1 * | 11/2001 | Nagao et al. | 52/173.3 |
| 2002/0043277 A1 * | 4/2002 | Yamawaki | 136/244 |
| 2004/0031219 A1 * | 2/2004 | Banister | 52/220.2 |
| 2004/0031518 A1 * | 2/2004 | Plantfeber | 136/251 |
| 2004/0144043 A1 * | 7/2004 | Stevenson et al. | 52/173.3 |
| 2004/0182432 A1 * | 9/2004 | Yoda et al. | 136/244 |
| 2005/0061360 A1 * | 3/2005 | Horioka et al. | 136/244 |
| 2005/0279400 A1 * | 12/2005 | Banister | 136/244 |

* cited by examiner

PHOTOVOLTAIC BUILDING MATERIALS AND RELATED METHODS OF INSTALLATION

PRIORITY TO APPLICATION

This Application claims the benefit of U.S. Provisional Application Ser. No. 60/523,417, filed on Nov. 19, 2003, and entitled "Photovoltaic Building Materials and Related Methods of Installation," which is commonly assigned with the present application and incorporated herein by reference for all purposes.

TECHNICAL FIELD

Disclosed embodiments herein relate generally to building materials for covering the hip, ridge, rake, or other portion of a roof, and more particularly to materials disposed above a hip, ridge, rake, or other roof portion incorporating or comprising a solar panel(s) having a self-aligning mechanism for the rapid and uniform installation and electrical interconnection of a number of such materials.

BACKGROUND

The presence and use of electricity is an everyday necessity that every modem home and business enjoys. Equally enduring is the periodic cost of that electricity, based on the amount, typically in kilo-watt/hours (kwh), used at the specific location. Efforts to combat the ever-present high-cost of electricity in homes and businesses have explored a number of different avenues. For example, in the general consumer market (e.g., residences) solar power as a replacement for electricity provided by typical utility companies has been attempted relatively unsuccessfully in so-called "off-grid" connections. Such off-grid connections embody the use of solar power in lieu of conventional in-home electricity.

Whether it be the initial costs associated with such off-grid systems or the relatively difficult and costly maintenance required, off-grid systems have typically not been accepted by the consumer market. As a result, the use of solar power to supplement, rather than replace, conventional electricity has continued to gain acceptance. These so-called "on-grid" systems typically work in conjunction with conventional electrical connections to supplement that electrical power, for example, during times of peak use. By supplementing conventionally available electricity, the overall annual cost of residential (or commercial) electricity may be substantially reduced.

Conventional residential solar-powered on-grid systems are typically incorporated into the roof of a house, due to its orientation towards the sky. Earlier systems employed large, flat crystal solar panels dispersed across the surface of the roof to collect the solar energy. However, the fragility and high cost of the crystal materials, as well as the clearly distinguishable appearance of the panels from ordinary roofing shingles, has resulted in essentially a rejection of such system by the market place.

Modem systems have developed strips of solar shingles that are more durable and predominantly resemble ordinary roofing shingles, thus substantially concealing the system from plain view. Unfortunately, even such modem system suffer from deficiencies, such as the need to form multiple holes through the roof and into the attic area for each shingle strip in order to electrically connect all of the shingle strips to create a functional system. As the number of holes formed through the roof increase, so too do the chances of leakage through the roof during inclement weather. Moreover, making the electrical connections from one shingle strip to the next, and then to the circuit breaker box of the home, is typically quite tedious and exhausting. In addition, because the shingle strips replace the ordinary shingles typically used on roofs, an experienced or specifically skilled installer is typically needed to properly align the solar shingle strips during installation, just as with ordinary shingles, so that the aesthetics of the entire roof are preserved. Even so, panels located in the middle of a roofing section tend to be aesthetically unpleasing as they detract from the section's homogeneous and symmetrical appearance. As a result, a relatively inexpensive and residentially available solar-powered system is needed that does not suffer from these deficiencies.

BRIEF SUMMARY

Disclosed herein are solar powered photovoltaic (PV) building materials, such as roofing shingles, and related PV systems employing such materials. Methods of installing such materials are also disclosed. The disclosed PV systems and methods beneficially provide solar power to structures in either off-grid or on-grid connections. In one exemplary embodiment, interconnected PV modular roofing structures are for use on a hip, ridge, or rake of a roof as replacement for typical asphalt shingles. In some embodiments, the PV modular roofing structure includes a rigid back member and a PV solar panel mounted on the back member. In addition, the back member is sized substantially the same as the size of the solar panel, and is attached to an underside surface of the solar panel. In other embodiments, the PV modular roofing structure is a single piece of building material incorporating PV solar panel and a supporting back member.

Further, such PV modular roofing structures include conductive rods extending from the top surface of the back member to its bottom surface. At one end, the conductive rods make electrical contact with the underside of the PV solar panel, while the opposing ends extend away from the back member at one end of the PV modular roofing structure and are configured to make electrical contact with contact traces on the underside of the back member of an adjoining PV modular roofing structure partially overlapping the end of the first PV modular roofing structure. By employing the conductive rods, a series of PV modular roofing structures may be easily installed without the need to individually wire the modular roofing structures together, or to form holes through the roof for passing wires. In a specific embodiment, the PV solar panel further comprises photoelectric silica spheres across its upper surface, which in addition to generating the solar electricity also appear similar to the granules typically found on the exterior of asphalt-based shingles.

In one embodiment, the back member includes a step in thickness in a cross-sectional plane perpendicular to the substantially planar lower surface and parallel to the longitudinal axis of the back member. In addition, the thickness of the back member at the high level of the step is greater than the thickness of the back member at one of its ends. In a specific embodiment, the back member is composed of an injection-molded thermoplastic. Alternatively, the back member may be composed of any rigid material suitable for outdoor exposure, such as molded recycled tire rubber, metal, or even wood. In yet another embodiment, the back member includes a trapezoid-shaped base. The step in thickness of the back member is provided by a step in the height of the walls in a cross-sectional plane perpendicular to the base and parallel to the longitudinal axis of the back member.

For installation with "ridge vent" systems (to be discussed below), the back member preferably includes a plurality of channel walls extending from the base and communicating between a sidewall of the back member and an area near the longitudinal center axis of the PV solar panel. Preferably, the channels are formed in a herringbone pattern. Through the channels, the PV modular roofing structure is able to vent air escaping through a ridge opening formed at the apex of the ridge in a structure of the roof to the outside environment.

BRIEF DESCRIPTION OF THE DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. In addition, it is emphasized that some components may not be illustrated for clarity of discussion. Reference is now made to the following descriptions taken in conjunction with the accompanying drawings, in which.

DETAILED DESCRIPTION OF PREFERRED EMBODIMENTS

Figure 1:
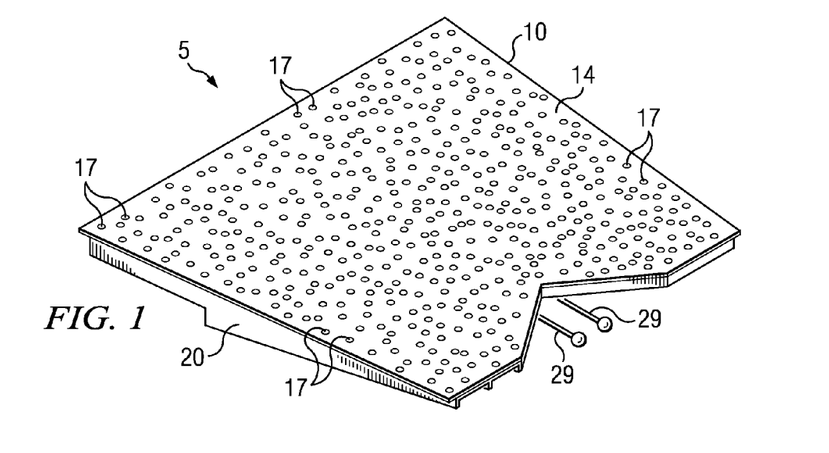
FIG. 1 illustrates an isometric view of an exemplary embodiment of a PV modular roofing structure for use in a solar-powered electrical system constructed according to the principles disclosed herein.

Referring initially to FIG. 1, illustrated is an isometric view of a building material 5 for use in a photovoltaic (PV) solar-power electrical system constructed according to the principles disclosed herein. The material 5 is a PV modular roofing structure 5 and includes a PV solar panel 10 and a back member 20. The photovoltaic panel 10 may be in the form of any symmetrical shape, such as a rectangle or a trapezoid. As shown in FIG. 1, however, the PV solar panel 10 is preferably trapezoid shaped because a trapezoid shape has been found to yield the best general appearance when the PV modular roofing structure 5 is installed in certain types of roofing layouts, as discussed in greater detail below.

The PV solar panel 10 is comprised of any type of photoelectric material capable of use in a solar-powered electrical system. For example, the PV solar panel 10 may be a solar panel based on thin films, or even conventional crystal/silica solar panels. In another exemplary embodiment, the PV solar panel 10 may be a solar panel constructed from photoelectric silica spheres 17 formed on an aluminum base or frame. Examples of such spherical photoelectric systems are produced by Spheral Solar Power, Inc. of Cambridge, Ontario in Canada. Of course, a PV system constructed as described herein is not limited to the use of spherical solar panels, and may employ any type of solar panel either now existing or later developed.

One advantage to the use of spherical solar panels is the aesthetic value provided by this relatively new technology. For example, as shown in FIG. 1, the spheres 17 in such systems are randomly dispersed across the exposed face of the PV solar panel 10. As such, the spheres 17 may closely resemble the granules typically employed with asphalt-based shingles, when the disclosed modular roofing structures are used as replacements for conventional shingles. As a result, passersby viewing an installed system as taught herein will have a difficult time distinguishing a system of the present disclosure and a conventional asphalt-based roof. In addition, current technology allows such photovoltaic spheres to be formed in a variety of colors. Thus, an even more aesthetically pleasing result may be achieved by selecting or customizing specific colors for the spheres comprising the PV solar panel 10.

When manufactured, the PV roofing structures 5 may have any shape and may be constructed to any desired size. However, since the PV structures 5 are photovoltaic devices, the needed exposed surface area of each structure (for generating the desired amount of energy) should be taken into consideration. In an exemplary embodiment of the PV roofing structure 5, the exposed surface area of the structure 5 may provide 1 to 2 square feet of photovoltaic capabilities. In one specific example, the width of the PV structure 5 may be about 26 inches, while the length may be about 14 inches. In such an embodiment, the PV structure 5 may provide approximately one to two square feet of photovoltaic surface area. Of course, no limitation to any particular size for the PV structure 5 is intended.

Figure 2:
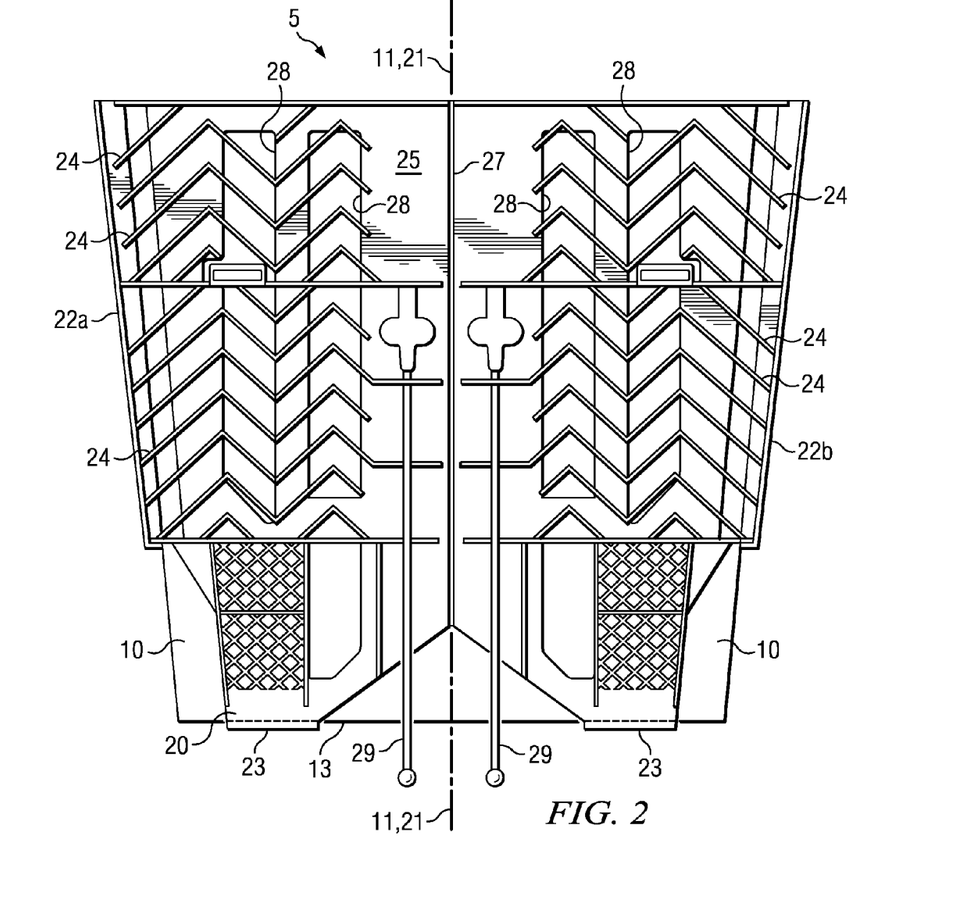
FIG. 2 illustrates a bottom view of the PV modular roofing structure of FIG. 1.

Turning now to FIG. 2, illustrated is a bottom view of the PV modular roofing structure 5 illustrated in FIG. 1. As shown in FIG. 2, the back member 20 extends substantially the width of the PV modular roofing structure 5 and is attached to the PV solar panel 10 by any suitable adhesive or by another affixing means. In addition, the back member 20 includes a base 25 having a predominately trapezoid shape for mounting the PV solar panel 10, and has substantially the same length as the PV solar panel 10. For example, in an exemplary embodiment, if the PV solar panel 10 has a length of 13¼ inches, the back member 20 may be 13 inches long.

The back member 20 is attached to the PV solar panel 10 such that a longitudinal center axis 11 of the PV solar panel 10 and a longitudinal center axis 21 of the back member 20 are aligned. In addition, in the illustrated embodiment, a short edge 13 of the PV solar panel 10 and a short edge 23 of the back member 20 are also aligned. For the purposes of this specification, the end of the PV modular roofing structure 5 having the short edges 13, 23 of the PV solar panel 10 and back member 20 will be referred to as the "back end," and the opposite end of the PV modular roofing structure 5 will be referred to as the "front end."

Also, the back member 20 has two sidewalls 22a and 22b extending from the base 25. The back member 20 also has multiple channel walls 24 spreading across the base 25, and in this embodiment are arranged in a "herringbone" pattern to provide support for the back member 20, and thus the overall PV modular roofing structure 5. To facilitate the folding of the PV modular roofing structure 5, the back member 20 preferably has a slit 27 along its longitudinal center axis 21. The base 25 also has rectangular holes 28 in areas proximate the channel walls 24. Advantageously, the holes 28 may be employed so as to limit twisting and deforming of the base 25 under elevated temperatures that are commonly experienced on the roofs of buildings. This feature is especially beneficial with PV modular roofing structures as disclosed herein are employed as building materials on the roofs of structures to provide solar power thereto.

In an exemplary embodiment, the back member 20 is manufactured from an injection-molded thermoplastic material, such as injected-molded polystyrene, polypropylene, or polyethylene. The polystyrene, polypropylene, or polyethylene materials may be low, medium, or high density and may be used with 40% to 70% filler by weight. Such filler may include limestone, gypsum, aluminum trihydrate (ATH), cellulose fiber, and plastic polymer fiber. Other thermoplastic materials that may be used include ethylene-vinyl-acetate (EVA) polymer materials, ethylene-mythylene-acrylate (EMAC) materials, neoprene materials, and polychlorosulfonated polymer (Hypalon) materials. Although an injection-molded thermoplastic material is described herein, any rigid material suitable for outdoor exposure is also suitable for manufacturing the back member 20. F or example, molded recycled tire rubber, metal, or wood may also be used.

Also illustrated on the PV modular roofing structure 5 is a pair of conductive rods 29 (one of which is labeled 29). The conductive rods 29 extend from the back end of the PV modular roofing structure 5, and extend parallel to the longitudinal axis 21 of the back member 20. In an exemplary embodiment, the conductive rods 29 are comprised of copper, but any appropriate electrically conductive material may also be employed. Preferably, the conductive rods 29 are rigid and are permanently affixed to the back member 20. In one embodiment, the conductive rods 29 are integrated into the process for forming the back member 20, such that the conductive rods 29 pass from the top side of the back member 20 to its bottom side. In other embodiments, the conductive rods 29 are installed on the back member 20, for example, with clips, after the member 20 has been formed. For example, holes are formed from the front to the back of the back member 20, and the conductive rods 29 passed therethrough and secured to the back member 20. Of course, other methods for manufacturing the back member 20 with the conductive rods 29 may also be employed.

By passing from one side of the back member 20 to the other, the conductive rods 29 provide an electrical connection between these two sides. As such, when the PV solar panel 10 is installed on the top of the back member 20, the conductive rods 29 provide a conduit for transmitting the electricity generated by the solar panel 10 to the underside of the back member 10. Once transferred to the underside of the back member 20 of one PV modular roofing structure 5, the extension of the conductive rods 29 out from the PV modular roofing structure 5 provide an opportunity to contact conductive traces on the underside of an adjoining PV modular roofing structure (not illustrated), which are electrically connected to the conductive rods on this adjoining PV modular roofing structure, thus continuing the electrical circuit between PV modular roofing structures. Alternatively, if no further PV modular roofing structures are being employed, the conductive rods 29 provide an easily accessible connection point for electrically coupling the PV modular roofing structures in the PV system with a power converter or directly to the structure's electrical breaker box. As a result, the conductive rods 29 allow a quick and easy process for installing a plurality of PV modular roofing structures constructed as disclosed herein by allowing adjoining PV modular roofing structures to be overlapped a predetermined distance so that the conductive rods 29 make electrical contact with the next PV modular roofing structure.

Embodiments employing the disclosed PV modular roofing structure 5 may also incorporate a ventilation function for use in "ridge vent" systems. Presently, many homes and structures are constructed such that the peak of a roof has an opening of approximately two inches along its length. This opening is conventionally covered by a special ridge vent material that allows air to pass out of the home, but prevents insects and moisture from entering into the home. For a detail disclosure of ridge vent shingles and ridge vent systems, see U.S. Pat. Nos. 6,418,692 and 6,530,189, which are commonly owned by the Assignee of the present disclosure and are incorporated herein by reference for all purposes. When a PV modular roofing structure 5 with the back member 20 is used as roofing material and placed on a ridge vent roof, the air being vented from the ridge of the roof passes through the channels formed by the channel walls 24 to the outside environment. Advantageously, the herringbone pattern of the channel walls 230 prevents the entry of water into the ridge vent by forcing the water to take a difficult path through the back member 20.

Accordingly, the installation of ridge vent material underneath the PV modular roofing structure 5 is not necessary, and only a one-step installation process is needed to install PV modular roofing structures according to this embodiment on a ridge vent roof. Moreover, when employing the PV modular roofing structures disclosed herein as part of a ridge vent system, the conductive rods 29 discussed above can easily pass through the opening at the ridge of the roof, thus removing the need to form multiples holes across the roof to provide an avenue for electrically connecting the PV modular roofing structures, as is commonly found conventional solar-power roof systems. The use of the PV modular roofing structures disclosed herein as building materials in ridge vent systems is described in greater detail with reference to FIG. 7.

Figure 3:
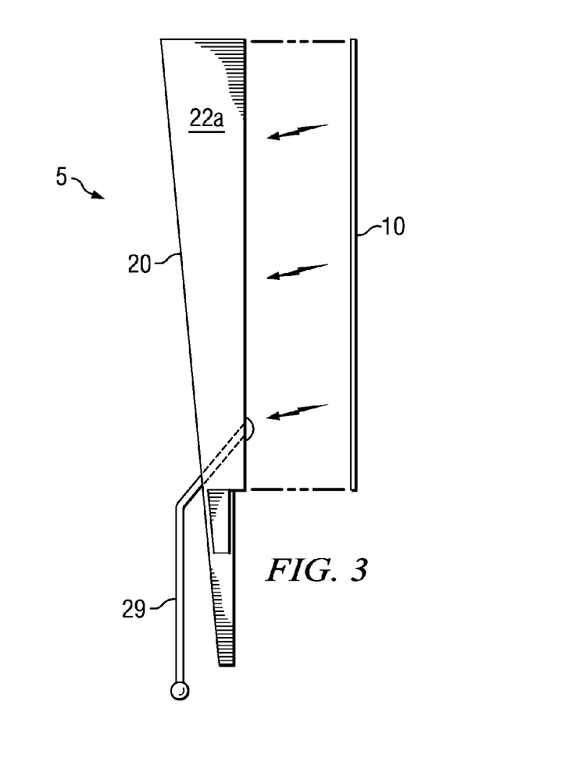
FIG. 3 illustrates a side view of the PV modular roofing structure illustrated in FIGS. 1-2, viewed along an axis perpendicular to the longitudinal center axis of the solar panel.

Turning now to FIG. 3, illustrated is a side view of the PV modular roofing structure 5 illustrated in FIGS. 1-2, viewed along an axis perpendicular to the longitudinal center axis 11 of the solar panel 10. As shown in FIG. 3, the sidewall 22a of the back member 20 is composed of a wedge-shaped or triangular section that extends along a length of the PV modular roofing structure 5. Sidewall 22b is substantially identical, yet opposite, to sidewall 22a. In addition, at any point along the longitudinal axis 21 of the back member 20, the height of each of the channel walls 24 (as well as any other support walls included on the back member 20) corresponds to the height of the sidewalls 22a and 22b at that longitudinal position.

Also shown in FIG. 3 is one of the conductive rods 29 discussed above. As described above, the conductive rods 29 pass through the body of the back member 20 to provide an electrical connection from the top of the back member 20 to its bottom side. As the PV solar panel 10 is placed on the top of the back member 20, if a two-piece structure for the PV modular roofing structure is used, electrical contact between the conductive rods 29 and the PV solar panel 10 is made. Specifically, the PV solar panel 10 may be designed with contact pads formed in particular locations on its underside. Thus, when the PV solar panel 10 is affixed to the back member 20, those contact pads would come into contact with the conductive rods 29. Then, electricity generated by the PV cells on the solar panel 10 may be transferred through the conductive rods 29 to the underside of the back member 20. In addition, the extension of the conductive rods 29 away from the trailing edge of the PV modular roofing structure 5 and towards the next PV modular roofing structure to be installed in the PV system may be seen.

Figure 4:
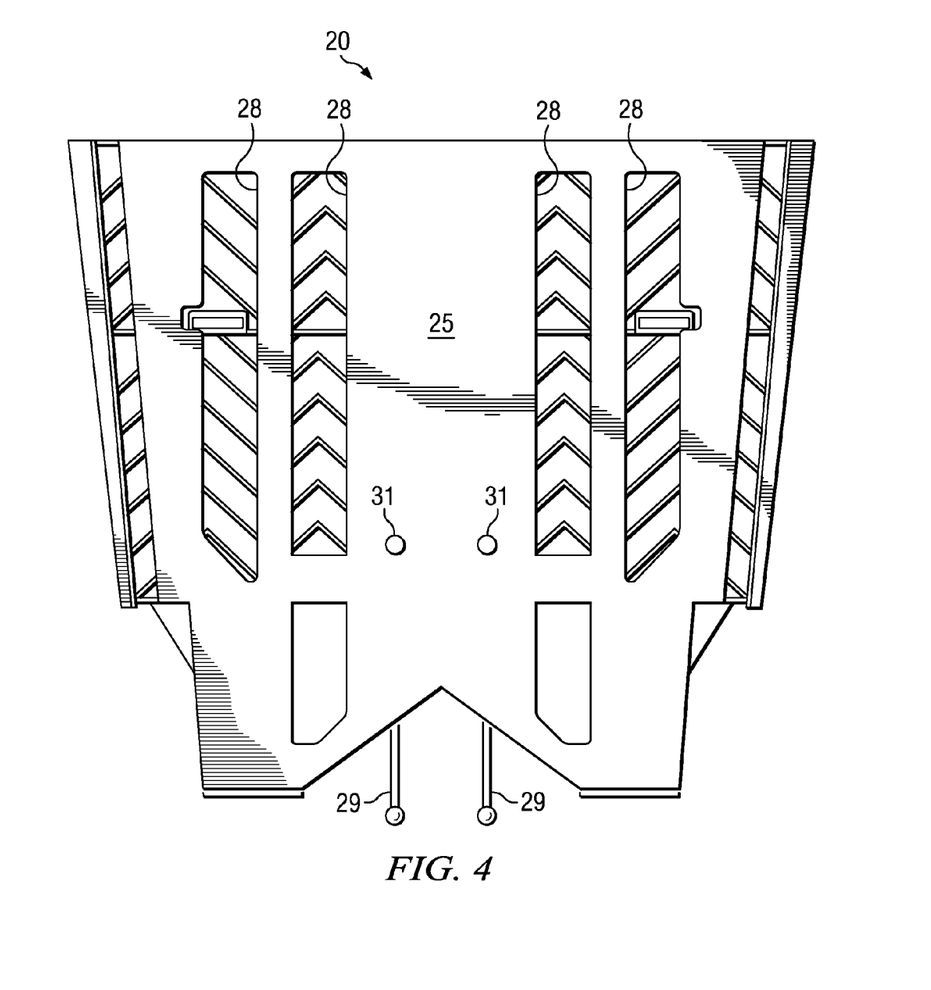
FIG. 4 illustrates a top view of the back member before attachment of the PV solar panel.

Looking now at FIG. 4, illustrated is a top view of the back member 20, before attachment of the PV solar panel 10. In one exemplary embodiment, the top surface of the back member 20 is corrugated, with the corrugations running longitudinally along the back member 20. In such an embodiment, the corrugations facilitate the adherence of the PV solar panel 10 to the back member 20, however this is not required. Also illustrated are the locations of the openings 28 over the channel walls 24 formed on the underside of the back member 20. Moreover, contact pads 31 that are electrically coupled to the conductive rods 29 may be seen on the top of the back member 20. While not required, employing contact pads 31 on the back member 20 facilitates an electrical connection from contact pads on the PV solar panel 10 (not illustrated) to the conductive rods 29.

Figure 5:
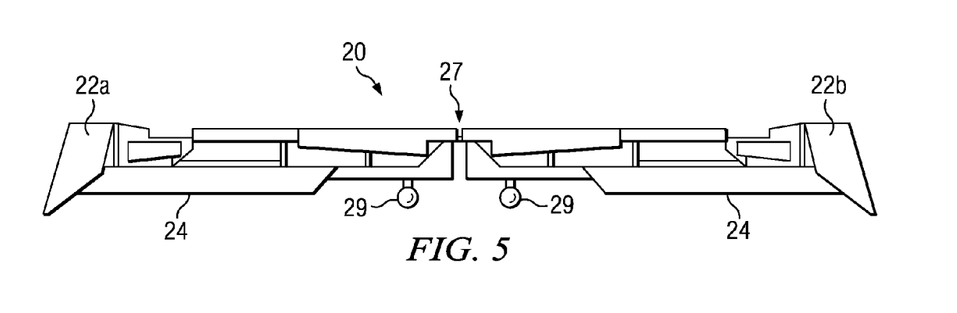
FIG. 5 illustrates a front view of the back member, viewed from the trailing edge of the PV modular roofing structure of FIGS. 1-2.

Referring now to FIG. 5, illustrated is a front view of the back member 20, viewed from the trailing edge of the PV modular roofing structure 5. The extension of the conductive rods 29 from the underside of the back member 20 may be seen from this front view. In addition, a folding point along the slit 27 described above can be more easily seen. More specifically, when employed in ridge vent systems, the back member 20 (and thus the solar panel 10 attached thereto) is bent along the longitudinal axis 21, where the thickness of the back member 20 is the least. As a result, the sidewalls 22a, 22b are brought downwards and towards each other, giving the PV modular roofing structure 5 a fold angle, for example, of about 75° to 90°. With such a fold, the PV modular roofing structure 5 may then be placed over the ridge opening in the roof, which is illustrated and described with reference to FIG. 7.

Figures 6, 7:
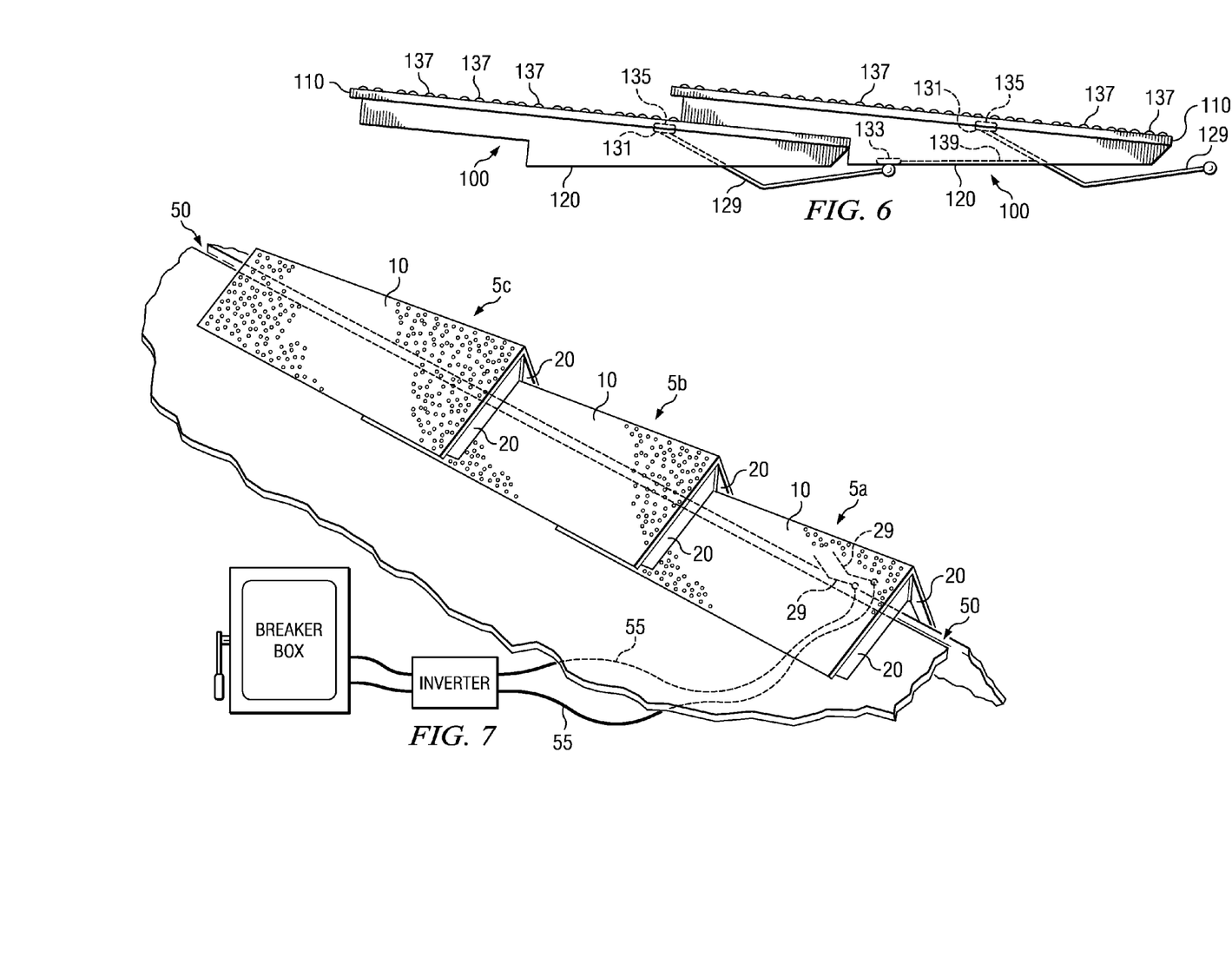
FIG. 6 illustrates a side view of a pair of interconnected PV modular roofing structures coupled together and employing the conductive rods described above.
FIG. 7 is an isometric view of a group of interconnected PV modular roofing structures after installation on a hip, ridge, or rake portion of a roof.

Looking now at FIG. 6, illustrated is a side view of a pair of novel interconnected PV modular roofing structures 100a, 100b coupled together and employing conductive rods 129, as described above. Each of the PV modular roofing structures 100a, 100b includes a PV solar panel 110 and a back member 120, which are similar to the solar panel 10 and back member 20, respectively, illustrated in the previous figures. As illustrated, after the first PV modular roofing structure 100a is installed on a roof, the second PV modular roofing structure 100b is installed by partially overlapping the first PV modular roofing structure 100a.

In this exemplary embodiment, the back members 120 of the PV modular roofing structure 100a, 100b include a notch to help determine how much of the first PV modular roofing structure 100a is overlapped by the second PV modular roofing structure 10b. In such embodiments, by predetermining the amount of overlap, the installer of the PV system can be certain that the conductive rods 129 are properly aligned with respect to the adjoining PV modular roofing structure. For example, the conductive rods 129 of the first PV modular roofing structure 100a may be seen extending towards the second PV modular roofing structure 10b, and contacting underside contact pads 133 formed on the back members 120. The conductive rods 129 are electrically connected to the contact pads 133 via conductive traces 139 to maintain the electrical connection from one PV modular roofing structure to the next. As a result, an electrical connection may be made from the tip of the conductive rods 129 of one PV modular roofing structure, through the conductive rods 129 to contact pads 131 on the top of the back members 120, and then to contact pads 135 on the underside of the PV solar panels 110, without the use of wires along the way. Such interconnections simply continue from PV modular roofing structure to PV modular roofing structure until the roofline, ridge, hip or rake is completely covered.

Beneficially, since the electrical connection across the disclosed PV system is carried directly from one PV modular roofing structure to the next, external wiring for the system need only be connected to the conductive rods 129 of the PV modular roofing structures at the ends of a string of interconnected PV modular roofing structures. Thus, holes for wiring each solar panel to the system need not be made through the roof of the structure. Of course, not only does such a system of interconnected PV modular roofing structures eliminate the risk of leaks through such holes, but the installation process for the entirety of PV modular roofing structures is substantially simplified. More specifically, an installer need simply install one PV modular roofing structure over the next, at the predetermined alignment, without the need to drill holes and electrically connect each PV modular roofing structure along the way.

Also illustrated along the outer faces of the solar panels 110 are pluralities of photoelectric spheres 137 of the type described above. By employing such spheres 137 in the disclosed system, rather than traditional crystal solar panels and the like, the look of the granules typically found on the outside of asphalt-based shingles may be readily imitated when the disclosed PV modular roofing structures are used as building materials for roofs. Such imitation allows PV systems of the type disclosed herein to more easily blend-in with surrounding conventional asphalt roofs, so as not to draw unwanted attention to the roof of the structure. Also as mentioned above, this look may be further enhanced in those embodiments where colored photoelectric spheres 137 are employed. Of course, a PV system of modular roofing structures constructed as disclosed herein is not limited to the use of photoelectric spheres 137 for the power-generating components on the PV solar panels 110.

Turning finally to FIG. 7, illustrated is an isometric view of the placement of a series of interconnected PV modular roofing structures 5a, 5b, and 5c after installation on a hip, ridge, or rake portion of a roof. Each of the PV modular roofing structures 5a, 5b, and 5c is a PV solar-power modular roofing structure constructed according to the principles disclosed herein. In addition, as discussed above, each of the PV modular roofing structures 5a, 5b, 5c have been folded along its longitudinal center axis,(see above) to form an inverted V-shape with the rigid back members 20 inside of, and supporting, the solar panels 10. Once folded, the PV modular roofing structures 5a, 5b, 5c may then be used on the cap of the hip, ridge, or rake portion of a structure's roof.

To begin the installation process for the disclosed PV system, a first PV modular roofing structure 5a is placed on the hip, ridge, or rake portion of a roof, and installed by nailing or other suitable means. A second PV modular roofing structure 5b is then placed partially over the top of the first PV modular roofing structure 5a, with the front end of the second PV modular roofing structure 5b placed over the back end of the first PV modular roofing structure 5a. The front end of the second PV modular roofing structure 5b is then slid toward the front end of first PV modular roofing structure 5a until the step of the back member 20 of the second PV modular roofing structure 5b engages the edges of the first PV modular roofing structure 5a at the back end. The second PV modular roofing structure 5b is then nailed or otherwise suitably fastened in place on the roof, in a manner similar to that of the first PV modular roofing structure 5a. A third PV modular roofing structure 5c is then installed partially over the second PV modular roofing structure 5b, in the same or similar manner.

As will be appreciated by those skilled in the art, PV modular roofing structures according to the embodiment of FIG. 7 provide a number of benefits. First, the step of each back member 20 allows the next PV modular roofing structure to be easily aligned for a quick and uniform installation. Second, the thickness of the back member 20 enhances the appearance of the PV modular roofing structures and provides a wood-like look to the PV modular roofing structure when used as replacements for roofing shingles. Third, since the back member 20 is substantially the same length as the solar panel 10, the thickness of each PV modular roofing structure is enhanced across its entire length, and the PV modular roofing structures thereby avoid an exaggerated "saw-tooth" appearance after installation. Also, since the back member 20 of each PV modular roofing structure is made of a rigid material, the PV modular roofing structures will not droop over time or after exposure to extreme temperatures.

Furthermore, by carrying the electrical connection directly from one PV modular roofing structure to the next, external wiring for the PV system need only be connected to the end PV modular roofing structures, and no holes for such wiring need to be made in the roof along the way. Moreover, in ridge (or similar) installations, the ridge opening provides access to the attic of the structure into which wires needed for the PV system are typically run. FIG. 7 illustrates a ridge opening 50 formed at the cap of the ridge of the roof prior to installing the PV modular roofing structures 5a, 5b, 5c. The opening 50 is made so that the underside of the roof (and attic) may be properly ventilated, thus increasing heating and cooling efficiency of the structure. As the vented air rises up through the opening 50, it is funneled through the channel walls described above and out of the structure through vent holes along the sidewalls 22a, 22b of each of the structures 5a, 5b, 5c.

Once all of the PV modular roofing structure 5a, 5b, 5c for the system have been installed, electrical wires 55 need only be attached to the end(s) of the string of interconnected PV modular roofing structures, and passed through the opening 50 and into the structure for connection to the PV system. As may be seen, since both the wires 55 and conductive rods 29 are covered beneath the folded PV modular roofing structures 5a, 5b, 5c, these electrical components are sheltered from inclement weather after installation. In an advantageous embodiment, the wires 55 are electrically connected to an inverter (or similar circuitry) and then to the electrical breaker box for the structure, in order to provide an on-grid PV solar power system to supplement the traditional electricity provide by the local utility company. Of course, in other embodiments, the PV modular roofing structures 5a, 5b, 5c may be wired to a power converter for storage of the electricity generated by the PV solar panels 10 on the PV modular roofing structures 5a, 5b, 5c in electrical storage devices, such as batteries. In either embodiment, the series electrical interconnection of the PV modular roofing structures 5a, 5b, 5c provides for both simplified installation and simplified wiring of the PV system.

In yet another embodiment, the PV roofing structures 5a, 5b, 5c may still be placed end-to-end as illustrated, but all three structures formed together as a single elongated unit. In such embodiments, the complete structure would look basically the same as in the other embodiments discussed, however, the installation of longer units would be quicker and would have less modular connections to be concerned with. In one example of such an embodiment, only the first roofing structure 5a includes the electrical conductors 29 the extend out to contact the next PV structure. Thus, the second and third PV structures 5b, 5c may simply be electrically interconnected using any other means rather than employing the extending electrical conductors 29 that contact the adjacent PV structure when separate PV structures are individually installed. In addition, in such embodiments, the back member located at the back end of the overall elongated structure (a structure including 5a, 5b, and 5c together) may still include contact pads 131, 133 (see FIG. 6) to provide an electrical connection point for another large PV structure formed from multiple PV structures/rigid back members. When embodiments such as these are constructed and installed, an additional benefit provided is the speed and ease of installation given fewer electrical interconnections. More specifically, although such larger PV structures still connect to an adjacent PV structure in the same manner described above, the larger PV structures occupy more roof area per unit, thus decreasing the number of PV structures installed and decreasing overall installation times. While various embodiments of photovoltaic shingles constructed according to the principles disclosed herein, and PV system incorporating such PV modular roofing structures, have been described above, it should be understood that they have been presented by way of example only, and not limitation. The breadth and scope of the invention(s) should thus not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Multiple inventions are set forth according to the limitations of the multiple claims associated with this disclosure, and the claims accordingly define the invention(s), and their equivalents, that are protected thereby. In all instances, the scope of the claims should not be constrained by the headings set forth herein.

What is claimed is:

1. A photovoltaic hip, ridge, or rake modular roofing structure, comprising:
   a photovoltaic shingle panel having a substantially planar lower surface and an upper surface;
   a rigid back member having a length substantially the same as or greater than the length of the shingle panel and attached to the substantially planar lower surface of the shingle panel;
   opposing polarity electrical contact pads located on a lower surface of the back member; and
   opposing electrical conductors electrically coupled to the photovoltaic shingle panel via the lower surface and passing through the rigid back member and out the lower surface of the back member, the electrical conductors electrically coupled to the corresponding contact pads and extending past a front end of the back member sufficient to electrically contact corresponding opposing electrical contact pads located on another rigid back member of a separate modular roofing structure couplable to the first rigid back member.

2. A photovoltaic hip, ridge, or rake modular roofing structure according to claim 1, wherein the rigid back member comprises a step in thickness along a cross-sectional plane perpendicular to the substantially planar lower surface and parallel to the longitudinal axis of the rigid back member, wherein the overall thickness of the rigid back member at a highest level of the step is greater than the thickness of the front or back end of the rigid back member.

3. A photovoltaic hip, ridge, or rake modular roofing structure according to claim 2, wherein the rigid back member comprises a trapezoid-shaped base and a plurality of walls extending from the base, the walls having a step in height in a cross-sectional plane that is perpendicular to the base and parallel to the longitudinal axis of the rigid back member, the step in height of the walls providing the step in thickness of the rigid back member.

4. A photovoltaic hip, ridge, or rake modular roofing structure according to claim 3, wherein the plurality of walls includes first and second sets of walls disposed on opposite sides of and perpendicular to the longitudinal center axis of the rigid back member.

5. A photovoltaic hip, ridge, or rake modular roofing structure according to claim 4, wherein each wall in the first set of walls and a corresponding wall in the second set of walls are offset from each other about the longitudinal axis of the rigid back member by an amount greater than the width of each wall.

6. A photovoltaic hip, ridge, or rake modular roofing structure according to claim 2, wherein the step is configured to receive a front end of a second modular roofing structure that is substantially identical to the hip, ridge, or rake modular roofing structure.

7. A photovoltaic hip, ridge, or rake modular roofing structure according to claim 1, wherein the rigid back member comprises channels having openings formed therein communicating between a side of the rigid back member and an area near the longitudinal center axis of the shingle panel, whereby when the modular roofing structure is installed on a ridge vent roof, the channels allow ventilation of the roof to the outside environment.

8. A photovoltaic hip, ridge, or rake modular roofing structure according to claim 7, wherein the channels are arranged in a zig-zag or herringbone pattern.

9. A photovoltaic hip, ridge, or rake modular roofing structure according to claim 7, wherein the rigid back member comprises a trapezoid-shaped base having longitudinal edges and a plurality of walls extending from the base, the plurality of walls forming the channels.

10. A photovoltaic hip, ridge, or rake modular roofing structure according to claim 9, wherein the rigid back member includes a plurality of pins extending from the longitudinal edges of the base.

11. A photovoltaic hip, ridge, or rake modular roofing structure according to claim 1, wherein the rigid back member includes a planar upper surface that is attached to the substantially planar lower surface of the shingle panel, a first lower surface inclined with respect to the upper surface, and a second lower surface adjacent to the first lower surface and parallel to the upper surface; and wherein the step in thickness of the rigid back member is formed at the juncture of the first lower surface and the second lower surface.

12. A photovoltaic hip, ridge, or rake modular roofing structure according to claim 1, wherein the rigid back member includes corrugations on the surface to be attached to the substantially planar lower surface of the shingle panel.

13. A photovoltaic hip, ridge, or rake modular roofing structure according to claim 1, wherein the rigid back member includes a slit along a portion of its longitudinal center axis for facilitating folding the rigid back member.

14. A photovoltaic hip, ridge, or rake modular roofing structure according to claim 1, wherein the rigid back member is composed of a material selected from the group consisting of molded recycled tire rubber, plastic, metal, and wood.

15. A photovoltaic hip, ridge, or rake modular roofing structure according to claim 14, wherein the rigid back member is composed of an injection-molded thermoplastic material.

16. A photovoltaic hip, ridge, or rake modular roofing structure according to claim 15, wherein the thermoplastic material is selected from the group consisting essentially of polystyrene, polypropylene, polyethylene, ethylene-vinyl-acetate (EVA), ethylene-mythylene-acrylate (EMAC), neoprene, and polychlorosulfonated polymer (Hypalon).

17. A photovoltaic hip, ridge, or rake modular roofing structure according to claim 1, wherein the modular roofing structure comprises a plurality of rigid back members formed together end-to-end, each of the plurality having a corresponding photovoltaic shingle panel electrically connected to an adjacent panel on the modular roofing structure, wherein a rigid back member at a front end of the modular roofing structure comprises opposing electrical conductors electrically coupled to its photovoltaic shingle panel via the lower surface and passing through the front end back member and out its lower surface, the electrical conductors extending past a front of the front end back member sufficient to electrically contact corresponding opposing electrical contact pads located on another rigid back member couplable to the front end of the modular roofing structure.

18. A photovoltaic hip, ridge, or rake modular roofing structure according to claim 17, wherein a rigid back member at a back end of the modular roofing structure comprises opposing electrical contact pads on its lower surface that is electrically coupled to its photovoltaic shingle panel and positioned so as to be contactable by corresponding opposing electrical conductors extending from another rigid back member couplable to the back end of the modular roofing structure.

* * * * *